United States Patent
Bitossi et al.

(10) Patent No.: US 6,946,414 B2
(45) Date of Patent: Sep. 20, 2005

(54) GLASS-CERAMICS, PROCESS FOR THE THEIR PREPARATION AND USE

(75) Inventors: Marco Bitossi, Montelupo Fiorentino (IT); Giovanni Baldi, Montespertoli (IT); Enrico Generali, Modena (IT); Davide Settembre Blundo, Modena (IT)

(73) Assignee: Colorbbia Italia S.p.A., Sovigliana Vinci (IT)

( * ) Notice: Subject to any disclaimer, the term of this patent is extended or adjusted under 35 U.S.C. 154(b) by 0 days.

(21) Appl. No.: 10/333,514

(22) PCT Filed: Jul. 18, 2001

(86) PCT No.: PCT/EP01/08298

§ 371 (c)(1),
(2), (4) Date: Jul. 28, 2003

(87) PCT Pub. No.: WO02/08135

PCT Pub. Date: Jan. 31, 2002

(65) Prior Publication Data

US 2004/0048729 A1 Mar. 11, 2004

(30) Foreign Application Priority Data

Jul. 21, 2000 (EP) .......................................... 00115736

(51) Int. Cl.⁷ ............................ C03C 8/00; C03C 10/04

(52) U.S. Cl. ............................ 501/21; 501/22; 501/23; 501/24; 501/26; 501/6; 501/7; 427/374.7

(58) Field of Search .......................... 501/6, 7, 21–24, 501/26; 427/374.7

(56) References Cited

U.S. PATENT DOCUMENTS

| | | | |
|---|---|---|---|
| 3,368,712 A | 2/1968 | Sanford et al. | 220/64 |
| 3,565,644 A | 2/1971 | Eppler | 106/48 |
| 5,944,884 A | 8/1999 | Panzera et al. | 106/35 |
| 6,174,608 B1 * | 1/2001 | Bertocchi et al. | 428/426 |
| 6,605,554 B1 * | 8/2003 | Bitossi et al. | 501/10 |

FOREIGN PATENT DOCUMENTS

| | | |
|---|---|---|
| EP | 1 000 588 | 5/2000 |
| FR | 2.102.426 | 4/1972 |
| WO | WO 99/07651 | 2/1999 |

* cited by examiner

*Primary Examiner*—Karl Group
(74) *Attorney, Agent, or Firm*—Ohlandt, Greenley, Ruggiero & Perle, L.L.P.

(57) ABSTRACT

Glass-ceramic consisting of: $SiO_2$: –30–70 wt %; $Al_2O_3$: 8–45 wt %; $M_2O$: 8–30 wt %; MO: 0–30 wt %; $B_2O_3$: 0–15 wt %; $P_2O_5$: 0–15 wt %; $Zr_2O$: 0–12 wt %; $TiO_2$: 0–12 wt %, wherein M is chosen in the group consisting of: Li, NA, K or mixture thereof; M' is chosen in the group consisting of: Be, Mg, Ca, Ba, Sr, Zn, Pb or mixture thereof are described.

4 Claims, No Drawings

GLASS-CERAMICS, PROCESS FOR THEIR PREPARATION AND USE

FIELD OF THE INVENTION

The present invention refers to glass-ceramic consisting of:

| | |
|---|---|
| $SiO_3$ | 30–70% |
| $Al_2O_3$ | 8–45% |
| $M_2O$ | 8–30% |
| M'O | 0–30% |
| $B_2O_3$ | 0–15% |
| $P_2O_5$ | 0–15% |
| $Zr_2O$ | 0–12% |
| $TiO_2$ | 0–12% | wherein:
M is chosen in the group consisting of: Li, Na, K or mixture thereof;
M' is chosen in the group consisting of: Be, Mg, Ca, Ba, Sr, Zn, Pb or mixture thereof; (the percentage being calculated in weight on the total of the mixture) their preparation and use in the production of glazed or porcelain stoneware products, ceramic bodies or glazes.

DISCUSSION OF THE BACKGROUND ART

It is known that glass is an amorphous material obtained by melting crystalline compounds followed by cooling down of the melted mass.

On the contrary glass-ceramics are vitreous systems that, when brought to a temperature $T_1$ higher then their glass transition temperature $T_g$ and lower then the melting temperature, present the formation of crystal nuclei (homogeneous or heterogeneous) with following crystal growth.

The known glass-ceramics are normally prepared by melting the starting materials into a fused mass which thereafter is cooled down by quenching giving vitreous amorphous scales, technically called frits, which are thereafter applied, possibly in combination with other additives, on the appropriate porous substrate (or are added to the other necessary compound in a ceramic body if porcelain stonewares are desired) and undergo the firing process during which a crystallisation of the vitreous phase takes place and the final wanted ceramic material is obtained.

Alternatively the melted mass can be cooled down and then submitted to appropriate termic cycles which induce the crystallisation in bulk.

In PCT/EP97/04387 (in the name of the same applicant) it is reported that when frits having a determined composition are ground before the firing process products having particularly advantageous properties are obtained.

A very important property of the vitreous frits is their thermal expansion coefficient (α) since they must follow the expansion of the porous substrate to which they are applied during the firing step. This is especially true in the so called double fast firing, single-firing gres technologies for the productions of glazes and engobes.

The above said property plays a critical role for example in the production of glazed or porcelain stoneware tiles which must be perfectly planar.

Up to now, in order to increase the thermal expansion coefficient of the glass-ceramics, two different approaches have been followed:
a) use of frits having an high content of fluorine;
b) use of frits having an high content of alkaline elements.

However, both the above said approaches present serious drawbacks. In fact the use of frits having an high content of fluorine implies pollution problems which require expensive, although often not satisfactory, technologies to be overcome; on the other side the frits having an high content of alkaline elements known up to now usually do not crystallise giving homogeneous glasses which, when used for example in the production of glazes, give products easily attacked by acids and even solve in aqueous media.

From what above said, it is clear the importance to make available new glass-ceramics having the desired properties and in particular an high thermal expansion coefficient.

SUMMARY OF THE INVENTION

The invention solves the above said problems thanks to new glass-ceramic having the composition reported above.

DETAILED DESCRIPTION OF THE INVENTION

Preferred according to the invention are glass ceramics having the following composition:

| | |
|---|---|
| $SiO_3$ | 40–60% |
| $Al_2O_3$ | 12–40% |
| $M_2O$ | 10–28% |
| M'O | 0–10% |
| $B_2O_3$ | 0–10% |
| $P_2O_5$ | 0–10% |
| $Zr_2O$ | 0–5% |
| $TiO_2$ | 0–5% |

Wherein M and M' are as above defined.

Particularly preferred are the glass ceramics as above defined wherein $M_2O$ represents a mixture of $Li_2O$, $Na_2O$ and $K_2O$, the total quantities of the mixture being as above defined as percentage of the total weight of the glass ceramic mixture.

Specific examples of glass-ceramics according to the present invention have the compositions reported hereinafter:

| Compound 1 (GV 1) | |
|---|---|
| $SiO_2$ | 42.3% |
| $B_2O_3$ | 3.2% |
| $P_2O_5$ | 0.6% |
| $Li_2O$ | 2.1% |
| $K_2O$ | 0.7% |
| $Na_2O$ | 22.2% |
| MgO | 0.9% |
| BaO | 0.2% |
| $Al_2O_3$ | 26.1% |
| $ZrO_2$ | 1.2% |
| $TiO_2$ | 0.5% |
| Compound 2 (GV 2) | |
| $SiO_2$ | 42.6% |
| $B_2O_3$ | 6.8% |
| $K_2O$ | 12.0% |
| $Na_2O$ | 12.0% |
| MgO | 5.0% |
| ZnO | 0.5% |
| $Al_2O_3$ | 18.0% |
| $ZrO_2$ | 5.1% |
| Compound 3 (GV 3) | |
| $SiO_2$ | 50.4% |

-continued

| | |
|---|---|
| $B_2O_3$ | 3.1% |
| $LiO_2$ | 7.3% |
| $K_2O$ | 6.2% |
| $Na_2O$ | 10.0% |
| $Al_2O_3$ | 23.0% |
| Compound 4 (GV 4) | |
| | |
| $SiO_2$ | 42.8% |
| $B_2O_3$ | 1.6% |
| $P_2O_5$ | 1.6% |
| $K_2O$ | 20.0% |
| $Na_2O$ | 2.0% |
| $Al_2O_3$ | 32.0% |
| Compound 5 (GV 5) | |
| | |
| $SiO_2$ | 55.2% |
| $K_2O$ | 17.0% |
| $Na_2O$ | 5.0% |
| $Al_2O_3$ | 18.0% |
| $ZrO_2$ | 2.1% |
| $TiO_2$ | 2.7% |
| Compound 6 (GV 6) | |
| | |
| $SiO_2$ | 62.1% |
| $B_2O_3$ | 2.0% |
| $K_2O$ | 0.8% |
| $Na_2O$ | 10.0% |
| BaO | 1.0% |
| $Al_2O_3$ | 21.0% |
| PbO | 3.1% |
| Compound 7 (GV 7) | |
| | |
| $SiO_2$ | 62.8% |
| $K_2O$ | 6.8% |
| $Na_2O$ | 7.4% |
| CaO | 1.5% |
| BaO | 1.0% |
| ZnO | 1.0% |
| $Al_2O_3$ | 19.0% |
| PbO | 0.5% |
| Compound 8 (GV 8) | |
| | |
| $SiO_2$ | 42.0% |
| $Na_2O$ | 15.6% |
| CaO | 5.8% |
| $Al_2O_3$ | 36.0% |
| PbO | 0.6% |
| Compound 9 (GV 9) | |
| | |
| $SiO_2$ | 78.7% |
| $K_2O$ | 10.2% |
| $Al_2O_3$ | 11.1% |
| Compound 10 (GV 10) | |
| | |
| $SiO_2$ | 54.2% |
| $Li_2O$ | 2.0% |
| $Na_2O$ | 16.5% |
| MgO | 3.0% |
| $Al_2O_3$ | 20.2% |
| $TiO_2$ | 3.1% |
| PbO | 1.0% |
| Compound 11 (GV 11) | |
| | |
| $SiO_2$ | 50.0% |
| $K_2O$ | 6.1% |
| $Na_2O$ | 18.1% |
| BeO | 5.4% |
| $Al_2O_3$ | 20.4% |
| Compound 12 (GV 12) | |
| | |
| $SiO_2$ | 45.2% |
| $B_2O_3$ | 10.1% |
| $K_2O$ | 1.2% |
| $Na_2O$ | 19.6% |
| SrO | 8.1% |
| CaO | 2.4% |
| ZnO | 1.1% |
| $Al_2O_3$ | 12.3% |

Other compositions according to the invention are reported in the following Table.

TABLE

| % | GV 13 | GV 14 | GV 15 | GV 16 | GV 17 |
|---|---|---|---|---|---|
| SiO2 | 49.47 | 49.47 | 48.51 | 47.57 | 43.56 |
| B2O3 | 4.90 | 4.90 | 4.80 | 4.71 | 5.10 |
| Li2O | 0.98 | 0.98 | 0.96 | 0.94 | 0.00 |
| Na2O | 7.59 | 7.59 | 7.44 | 7.30 | 19.10 |
| K2O | 2.35 | 2.35 | 2.30 | 2.26 | 0.00 |
| CaO | 2.97 | 1.97 | 4.85 | 1.89 | 1.15 |
| Al2O3 | 28.82 | 28.82 | 28.26 | 27.71 | 29.38 |
| ZrO2 | 2.92 | 2.92 | 2.86 | 2.81 | 1.72 |
| ZnO | 0.00 | 1.00 | 0.00 | 4.81 | 0.00 |

The glass-ceramic according to the invention can be used as such, in order to obtain ceramics, or can be added to the materials usually employed for preparing porcelain stoneware or glazes.

A part from the above said increasing of the thermal expansion coefficient the glass-ceramics according to the invention allows (thanks to their "in situ" crystallisation) to confer to glaze an exceptional opacization which results in an higher white index (WI) compared to that obtained with the normal opacifiers added to glass, moreover, thanks to the chemical stability and high mechanical resistance of the crystalline phase re-crystallised on the glaze surface, they confer to the substrate physico-chemical properties higher then those of the traditional glazes.

The glass-ceramics according to the present invention can be prepared according to a process which is substantially similar to those already applied in the art for the preparation of this kind of products.

The starting materials are melted, submitted to quenching in order to obtain the amorphous frits or, alternatively, the vitreous mass is cooled down to room temperature, according to known techniques (rolling, casting, glassblowing etc.), and thereafter submitted to the usual termic cycles (annealing, nucleation and growth) which cause the relaxation of internal strengths and induce the ceramisation of the vitreous mass.

Thereafter the frits are ground in a mill to give a vitreous powder which thereafter is applied to the wanted substrate, possibly in combination with the other additives normally used for the production of glazes or porcelain stoneware, and the substrate is submitted to the usual step of firing in order to obtain the final ceramic product as desired.

Preferably the starting oxides are melted in tank furnaces for ceramic frits (also gas or electric kilns for glass production can be used) and the melting temperature is normally comprised between 1400–1500° C.

When the quenching is performed, the cooling is obtained by using water or cold stainless iron cylinders; if the crystallisation in bulk is preferred the normal techniques known in the glass technology for this purposes are applied.

The grinding of the frits is performed using the known techniques (ball-mills, drum-mills, etc.) the final dimension of the powders are normally comprised between 5–50 microns (powders), 0.05–0.35 mm (frits grains) or 0.14–0.63 mm (pellets grains) according to the requirements of the following applications.

The powders or grains obtained through the grinding can be worked in the following steps (i.e. in the preparation of the final glazed and porcelain stoneware products) according to the techniques and the conditions normally used in such processes and well known to the man skilled in the art.

As above said the glass-ceramics according to the invention can be added to the materials normally used for the production of porcelain stoneware; the adding of the glass-ceramics according to the invention allows the production of ceramics via the process normally used for the production of porcelain stoneware this resulting in an important saving of energy.

For example for the production of porcelain stoneware bodies a glass-ceramic according to the invention is added to a traditional mixture of starting materials for the production of porcelain stoneware (for example: clays, (Na,K) feldspate, Na feldspate, feldspate sand) in the appropriate proportions. The mixture is loaded in a Alsing ball-mill (continuous or discontinuous) and ground in the presence of water to give a slurry which is dried in an atomiser forming hollow grains. The grains are shaped in the desired form by traditional pressing. The tiles are dried and fired in a traditional furnace at 900°–1230° C. giving the final product.

Alternatively the glass-ceramics powder cold be mixed with spray dried body inside a cylindrical chamber using rotating ploughshare-shaped tools to improve the sintering.

If glazes are desired, a glass-ceramic according to the invention and a starting material usually employed for the production of ceramic glazes (same as above but, as known, more pure in so far as chromogen metals are concerned) in the appropriate proportions, are loaded in a Alsing ball-mill in the presence of water and ground to obtain a so called "glazes" which was applied by airbrush, threading die, bell or serigraphy on a traditional substrate, crude or biscuited, obtained by pressing of atomised or dry-ground powders. The glaze, dried and/or granulated, can be deposited on the substrate surface by falling and fixed on the surface with appropriate ligants. Alternatively the pulverised glaze is combined with the porcelain stoneware body, then deposited in the mould of the press. The substrate is fired at 900°–1230° C. in a quick- or tunnel-furnace (continuous or discontinuous) giving the final product in which the glass-ceramic has induced a controlled crystallisation.

The glass-ceramics according to the invention can be used for the production of tiles, sanitary-wares, table-wares, bricks etc. using the common techniques known in the art.

Hereinafter are reported some examples for the preparation of the glass-ceramics according to the invention and their use in the preparation of porcelain stonewares and glazes.

EXAMPLE 1

To the glass-ceramic GV 3, as defined in the description (35% in weight) clay (10% w), (Na,K)-feldspate (20%), Na-feldspate (30% w), feldspate sand (5% w) are added. The mixture is loaded in a Alsing ball-mill (continuous or discontinuous) and ground in the presence of water to give a slurry which is dried in an atomiser forming hallow grains which are thereafter shaped in the form of tiles by traditional pressing.

The tiles are dried and fired in a traditional furnace at 900°–1230° C. giving the final product. The obtained tiles are constituted of syntherised and crystallised materials and a residual vitreous phase as demonstrated by mineral and X-ray analysis of the tile surface.

EXAMPLE 2

To the glass-ceramic GV 4 as defined in the description (50% w) clay (5% w), (Na,K)-feldspate (30%), Na-feldspate (15% w) are added.

The mixture is loaded in an Alsing ball-mill in the presence of water and ground to obtain a so called glaze which was applied by airbrush on a traditional substrate, crude, obtained by pressing the usual atomised ground powders.

The substrate is fired at 900°–1230° C. in a quick- or tunnel-furnace (continuous or discontinuous) giving the final product in which the glass-ceramic has induced a controlled crystallisaton.

The glaze tiles so obtained present a vitreous and crystallised part which confer to the product a very well defined microstructure as shown by SEM and X-rays diffractometry.

What is claimed is:

1. A glass ceramic having a composition

| | | |
|---|---|---|
| (1) | $SiO_2$ | 42.3 wt % |
| | $B_2O_3$ | 3.2 wt % |
| | $P_2O_5$ | 0.6 wt % |
| | $Li_2O$ | 2.1 wt % |
| | $K_2O$ | 0.7 wt % |
| | $Na_2O$ | 22.2 wt % |
| | $MgO$ | 0.9 wt % |
| | $BaO$ | 0.2 wt % |
| | $Al_2O_3$ | 26.1 wt % |
| | $ZrO_2$ | 1.2 wt % |
| | $TiO_2$ | 0.5 wt %; |
| (2) | $SiO_2$ | 42.6 wt % |
| | $B_2O_3$ | 6.8 wt % |
| | $K_2O$ | 12.0 wt % |
| | $Na_2O$ | 12.0 wt % |
| | $MgO$ | 5.0 wt % |
| | $ZnO$ | 0.5 wt % |
| | $Al_2O_3$ | 18.0 wt % |
| | $ZrO_2$ | 5.1 wt %; |
| (3) | $SiO_2$ | 50.4 wt % |
| | $B_2O_3$ | 3.1 wt % |
| | $LiO_2$ | 7.3 wt % |
| | $K_2O$ | 6.2 wt % |
| | $Na_2O$ | 10.0 wt % |
| | $Al_2O_3$ | 23.0 wt %; |
| (4) | $SiO_2$ | 42.8 wt % |
| | $B_2O_3$ | 1.6 wt % |
| | $P_2O_5$ | 1.6 wt % |
| | $K_2O$ | 20.0 wt % |
| | $Na_2O$ | 2.0 wt % |
| | $Al_2O_3$ | 32.0 wt %; |
| (5) | $SiO_2$ | 55.2 wt % |
| | $K_2O$ | 17.0 wt % |
| | $Na_2O$ | 5.0 wt % |
| | $Al_2O_3$ | 18.0 wt % |
| | $ZrO_2$ | 2.1 wt % |
| | $TiO_2$ | 2.7 wt %; |
| (6) | $SiO_2$ | 62.1 wt % |
| | $B_2O_3$ | 2.0 wt % |
| | $K_2O$ | 0.8 wt % |
| | $Na_2O$ | 10.0 wt % |
| | $BaO$ | 1.0 wt % |
| | $Al_2O_3$ | 21.0 wt % |
| | $PbO$ | 3.1 wt %; |
| (7) | $SiO_2$ | 62.8 wt % |
| | $K_2O$ | 6.8 wt % |
| | $Na_2O$ | 7.4 wt % |
| | $CaO$ | 1.5 wt % |
| | $BaO$ | 1.0 wt % |
| | $ZnO$ | 1.0 wt % |
| | $Al_2O_3$ | 19.0 wt % |
| | $PbO$ | 0.5 wt %; |
| (8) | $SiO_2$ | 42.0 wt % |
| | $Na_2O$ | 15.6 wt % |
| | $CaO$ | 5.8 wt % |
| | $Al_2O_3$ | 36.0 wt % |
| | $PbO$ | 0.6 wt %; |
| (9) | $SiO_2$ | 78.7 wt % |
| | $K_2O$ | 10.2 wt % |
| | $Al_2O_3$ | 11.1 wt %; |

-continued

| | | |
|---|---|---|
| (10) | $SiO_2$ | 54.2 wt % |
| | $Li_2O$ | 2.0 wt % |
| | $Na_2O$ | 16.5 wt % |
| | MgO | 3.0 wt % |
| | $Al_2O_3$ | 20.2 wt % |
| | $TiO_2$ | 3.1 wt % |
| | PbO | 1.0 wt %; |
| (11) | $SiO_2$ | 50.0 wt % |
| | $K_2O$ | 6.1 wt % |
| | $Na_2O$ | 18.1 wt % |
| | BeO | 5.4 wt % |
| | $Al_2O_3$ | 20.4 wt %; |
| (12) | $SiO_2$ | 49.47 wt % |
| | $B_2O_3$ | 4.90 wt % |
| | $Li_2O$ | 0.98 wt % |
| | $Na_2O$ | 7.59 wt % |
| | $K_2O$ | 2.35 wt % |
| | CaO | 2.97 wt % |
| | $Al_2O_3$ | 28.82 wt % |
| | $ZrO_2$ | 2.92 wt %; |
| (13) | $SiO_2$ | 49.47 wt % |
| | $B_2O_3$ | 4.90 wt % |
| | $Li_2O$ | 0.98 wt % |
| | $Na_2O$ | 7.59 wt % |
| | $K_2O$ | 2.35 wt % |
| | CaO | 1.97 wt % |
| | $Al_2O_3$ | 28.82 wt % |
| | $ZrO_2$ | 2.92 wt % |
| | ZnO | 1.00 wt %; |
| (14) | $SiO_2$ | 48.51 wt % |
| | $B_2O_3$ | 4.80 wt % |
| | $Li_2O$ | 0.96 wt % |
| | $Na_2O$ | 7.44 wt % |
| | $K_2O$ | 2.30 wt % |
| | CaO | 4.85 wt % |
| | $Al_2O_3$ | 28.26 wt % |
| | $ZrO_2$ | 2.86 wt %; |
| (15) | $SiO_2$ | 47.57 wt % |
| | $B_2O_3$ | 4.71 wt % |
| | $Li_2O$ | 0.94 wt % |
| | $Na_2O$ | 7.30 wt % |
| | $K_2O$ | 2.26 wt % |
| | CaO | 1.89 wt % |
| | $Al_2O_3$ | 27.71 wt % |
| | $ZrO_2$ | 2.81 wt % |
| | ZnO | 4.81 wt %; and |
| (16) | $SiO_2$ | 43.56 wt % |
| | $B_2O_3$ | 5.10 wt % |
| | $Na_2O$ | 19.10 wt % |
| | CaO | 1.15 wt % |
| | $Al_2O_3$ | 29.38 wt % |
| | $ZrO_2$ | 1.72 wt %. |

2. A glaze or porcelain stoneware comprising a glass ceramic according to claim 1.

3. A tile, sanitary-ware, table-ware, or brick comprising a glass-ceramic according to claim 1.

4. A process for the preparation of a glass-ceramic

| | | |
|---|---|---|
| (1) | $SiO_2$ | 42.3 wt % |
| | $B_2O_3$ | 3.2 wt % |
| | $P_2O_5$ | 0.6 wt % |
| | $Li_2O$ | 2.1 wt % |
| | $K_2O$ | 0.7 wt % |
| | $Na_2O$ | 22.2 wt % |
| | MgO | 0.9 wt % |
| | BaO | 0.2 wt % |
| | $Al_2O_3$ | 26.1 wt % |
| | $ZrO_2$ | 1.2 wt % |
| | $TiO_2$ | 0.5 wt %; |
| (2) | $SiO_2$ | 42.6 wt % |
| | $B_2O_3$ | 6.8 wt % |
| | $K_2O$ | 12.0 wt % |
| | $Na_2O$ | 12.0 wt % |
| | MgO | 5.0 wt % |
| | ZnO | 0.5 wt % |
| | $Al_2O_3$ | 18.0 wt % |
| | $ZrO_2$ | 5.1 wt %; |
| (3) | $SiO_2$ | 50.4 wt % |
| | $B_2O_3$ | 3.1 wt % |
| | $LiO_2$ | 7.3 wt % |
| | $K_2O$ | 6.2 wt % |
| | $Na_2O$ | 10.0 wt % |
| | $Al_2O_3$ | 23.0 wt %; |
| (4) | $SiO_2$ | 42.8 wt % |
| | $B_2O_3$ | 1.6 wt % |
| | $P_2O_5$ | 1.6 wt % |
| | $K_2O$ | 20.0 wt % |
| | $Na_2O$ | 2.0 wt % |
| | $Al_2O_3$ | 32.0 wt %; |
| (5) | $SiO_2$ | 55.2 wt % |
| | $K_2O$ | 17.0 wt % |
| | $Na_2O$ | 5.0 wt % |
| | $Al_2O_3$ | 18.0 wt % |
| | $ZrO_2$ | 2.1 wt % |
| | $TiO_2$ | 2.7 wt %; |
| (6) | $SiO_2$ | 62.1 wt % |
| | $B_2O_3$ | 2.0 wt % |
| | $K_2O$ | 0.8 wt % |
| | $Na_2O$ | 10.0 wt % |
| | BaO | 1.0 wt % |
| | $Al_2O_3$ | 21.0 wt % |
| | PbO | 3.1 wt %; |
| (7) | $SiO_2$ | 62.8 wt % |
| | $K_2O$ | 6.8 wt % |
| | $Na_2O$ | 7.4 wt % |
| | CaO | 1.5 wt % |
| | BaO | 1.0 wt % |
| | ZnO | 1.0 wt % |
| | $Al_2O_3$ | 19.0 wt % |
| | PbO | 0.5 wt %; |
| (8) | $SiO_2$ | 42.0 wt % |
| | $Na_2O$ | 15.6 wt % |
| | CaO | 5.8 wt % |
| | $Al_2O_3$ | 36.0 wt % |
| | PbO | 0.6 wt %; |
| (9) | $SiO_2$ | 78.7 wt % |
| | $K_2O$ | 10.2 wt % |
| | $Al_2O_3$ | 11.1 wt %; |
| (10) | $SiO_2$ | 54.2 wt % |
| | $Li_2O$ | 2.0 wt % |
| | $Na_2O$ | 16.5 wt % |
| | MgO | 3.0 wt % |
| | $Al_2O_3$ | 20.2 wt % |
| | $TiO_2$ | 3.1 wt % |
| | PbO | 1.0 wt %; |
| (11) | $SiO_2$ | 50.0 wt % |
| | $K_2O$ | 6.1 wt % |
| | $Na_2O$ | 18.1 wt % |
| | BeO | 5.4 wt % |
| | $Al_2O_3$ | 20.4 wt %; |
| (12) | $SiO_2$ | 49.47 wt % |
| | $B_2O_3$ | 4.90 wt % |
| | $Li_2O$ | 0.98 wt % |
| | $Na_2O$ | 7.59 wt % |
| | $K_2O$ | 2.35 wt % |
| | CaO | 2.97 wt % |
| | $Al_2O_3$ | 28.82 wt % |
| | $ZrO_2$ | 2.92 wt %; |
| (13) | $SiO_2$ | 49.47 wt % |
| | $B_2O_3$ | 4.90 wt % |
| | $Li_2O$ | 0.98 wt % |
| | $Na_2O$ | 7.59 wt % |
| | $K_2O$ | 2.35 wt % |
| | CaO | 1.97 wt % |
| | $Al_2O_3$ | 28.82 wt % |
| | $ZrO_2$ | 2.92 wt % |
| | ZnO | 1.00 wt %; |

-continued

| | | |
|---|---|---|
| (14) | $SiO_2$ | 48.51 wt % |
| | $B_2O_3$ | 4.80 wt % |
| | $Li_2O$ | 0.96 wt % |
| | $Na_2O$ | 7.44 wt % |
| | $K_2O$ | 2.30 wt % |
| | CaO | 4.85 wt % |
| | $Al_2O_3$ | 28.26 wt % |
| | $ZrO_2$ | 2.86 wt %; |
| (15) | $SiO_2$ | 47.57 wt % |
| | $B_2O_3$ | 4.71 wt % |
| | $Li_2O$ | 0.94 wt % |
| | $Na_2O$ | 7.30 wt % |
| | $K_2O$ | 2.26 wt % |
| | CaO | 1.89 wt % |
| | $Al_2O_3$ | 27.71 wt % |
| | $ZrO_2$ | 2.81 wt % |
| | ZnO | 4.81 wt %; and |
| (16) | $SiO_2$ | 43.56 wt % |
| | $B_2O_3$ | 5.10 wt % |
| | $Na_2O$ | 19.10 wt % |
| | CaO | 1.15 wt % |
| | $Al_2O_3$ | 29.38 wt % |
| | $ZrO_2$ | 1.72 wt %; | said process comprising the steps of:
  a) melting said composition to produce a vitreous mass of melted starting materials;
  b) quenching the melted starting materials in order to obtain amorphous frits;
  c) grinding said amorphous frits to produce a vitreous powder;
  d) optionally combining said vitreous powder with other additives;
  e) applying said vitreous powder to a substrate; and
  f) firing to obtain said glass ceramic.

\* \* \* \* \*